US007464619B2

(12) United States Patent
Vetter

(10) Patent No.: US 7,464,619 B2
(45) Date of Patent: Dec. 16, 2008

(54) OPERATOR ASSEMBLY

(75) Inventor: Gregory J. Vetter, Owatonna, MN (US)

(73) Assignee: Truth Hardware Corporation, Owatonna, MN (US)

(*) Notice: Subject to any disclaimer, the term of this patent is extended or adjusted under 35 U.S.C. 154(b) by 592 days.

(21) Appl. No.: 10/790,667

(22) Filed: Mar. 1, 2004

(65) Prior Publication Data

US 2004/0216541 A1 Nov. 4, 2004

Related U.S. Application Data

(60) Provisional application No. 60/451,462, filed on Mar. 1, 2003.

(51) Int. Cl.
*F16H 35/06* (2006.01)

(52) U.S. Cl. .......................... 74/396; 74/400; 384/125; 384/295

(58) Field of Classification Search ................ 74/89.18, 74/89.19, 89.16, 395, 396, 397, 400, 401; 384/125, 297, 298, 299, 300, 275, 276, 282, 384/295; 49/341, 339, 345, 337
See application file for complete search history.

(56) References Cited

U.S. PATENT DOCUMENTS

| | | | | |
|---|---|---|---|---|
| 1,985,655 | A * | 12/1934 | Floraday | 74/89.19 |
| 2,050,403 | A | 8/1936 | Weiner | |
| 2,082,066 | A | 6/1937 | Lackey | |
| 2,214,280 | A | 9/1940 | Lang | |
| 2,321,800 | A | 6/1943 | Cordrey et al. | |
| 2,610,054 | A | 9/1952 | Reynaud | |
| 2,635,485 | A | 4/1953 | Gravenstine et al. | |
| 2,686,669 | A * | 8/1954 | Johnson | 74/89.14 |
| 2,795,413 | A | 6/1957 | Rodaway | |
| 2,899,195 | A | 8/1959 | Ahlgren | |

(Continued)

FOREIGN PATENT DOCUMENTS

| | | |
|---|---|---|
| WO | WO 95/18284 | 7/1995 |

OTHER PUBLICATIONS

Truth Hardware, *Rh Single Arm Operator Assembly*, Drawing, pp. 1, Jan. 28, 1993.

(Continued)

*Primary Examiner*—David M Fenstermacher
(74) *Attorney, Agent, or Firm*—Patterson, Thuente, Skaar & Christensen PA

(57) ABSTRACT

An operator suitable for opening and closing casement windows includes a housing (e.g., a base and a cover), and an operator arm subassembly driven by a worm. The operator arm subassembly may include at least one operator arm pivotally disposed in the housing via a flanged bearing. The operator arm may define a gear. If a plurality of operator arms are present, a sun gear may be used. The flanged bearing properly aligns the components to reduce stresses encountered during use. The flanged bearing may have a base portion, a middle portion, and an upper portion in a stepped configuration. The base may engage the base of the housing. The upper portion of the bearing may engage a cover of the housing. A middle portion of the bearing pivotally joins the arm and/or sun gear. The instant flanged bearing provides a smoother, more efficient operation and increases the useful life of the operator.

38 Claims, 16 Drawing Sheets

U.S. PATENT DOCUMENTS

| | | | | |
|---|---|---|---|---|
| 2,926,905 | A | | 3/1960 | Ahlgren |
| 3,114,542 | A | | 12/1963 | Ahlgren |
| 3,811,715 | A | | 5/1974 | Brudy |
| 3,846,938 | A | | 11/1974 | Kelly |
| 4,037,483 | A | | 7/1977 | Nadal |
| 4,241,541 | A | | 12/1980 | Van Klompenburg et al. |
| 4,253,276 | A | | 3/1981 | Peterson et al. |
| 4,266,371 | A | | 5/1981 | Erdman et al. |
| 4,301,622 | A | | 11/1981 | Dunsmoor |
| 4,305,228 | A | | 12/1981 | Nelson |
| 4,445,794 | A | | 5/1984 | Sandberg |
| 4,497,135 | A | | 2/1985 | Vetter |
| 4,505,601 | A | | 3/1985 | Sandberg et al. |
| 4,674,149 | A | | 6/1987 | Vetter |
| 4,715,089 | A | | 12/1987 | Schema |
| 4,726,092 | A | | 2/1988 | Tacheny et al. |
| 4,823,508 | A | | 4/1989 | Allen |
| 4,840,075 | A | | 6/1989 | Tucker |
| 4,843,703 | A | | 7/1989 | Nolte et al. |
| 4,845,830 | A | | 7/1989 | Nolte et al. |
| 4,860,493 | A | | 8/1989 | Lense |
| 4,887,392 | A | | 12/1989 | Lense |
| 4,894,902 | A | | 1/1990 | Tucker |
| 4,932,695 | A | | 6/1990 | Pettit et al. |
| 4,938,086 | A | | 7/1990 | Nolte et al. |
| 5,054,239 | A | | 10/1991 | Tucker et al. |
| 5,272,837 | A | * | 12/1993 | Nolte et al. .................. 49/324 |
| 5,440,839 | A | | 8/1995 | Piltingsrud |
| 5,493,813 | A | * | 2/1996 | Vetter et al. .................. 49/341 |
| 5,509,234 | A | | 4/1996 | Klimek et al. |
| 5,531,138 | A | * | 7/1996 | Vetter ...................... 74/606 R |
| 5,623,784 | A | | 4/1997 | Kuersten et al. |
| 5,634,726 | A | * | 6/1997 | Edele et al. ................ 384/276 |
| 5,740,632 | A | | 4/1998 | Peterson et al. |
| 5,765,308 | A | | 6/1998 | Anderson et al. |
| 5,802,913 | A | * | 9/1998 | Winner ..................... 74/89.18 |
| 5,815,984 | A | | 10/1998 | Sheets et al. |
| 5,839,229 | A | | 11/1998 | Briggs et al. |
| 5,937,582 | A | | 8/1999 | Taylor |
| 6,044,587 | A | | 4/2000 | Vetter et al. |
| 6,122,863 | A | | 9/2000 | Tippin et al. |
| 6,128,858 | A | | 10/2000 | Vetter et al. |
| 6,247,270 | B1 | | 6/2001 | Huml |
| 6,374,544 | B1 | | 4/2002 | Ellis |
| 6,634,141 | B2 | | 10/2003 | Anderson et al. |
| 6,640,389 | B2 | | 11/2003 | Van Klompenburg et al. |
| 6,672,010 | B1 | * | 1/2004 | Gledhill et al. .............. 49/341 |
| D487,012 | S | | 2/2004 | Stoll et al. |
| 2002/0061145 | A1 | * | 5/2002 | Kobayashi et al. .......... 384/276 |
| 2004/0223674 | A1 | * | 11/2004 | Fidziukiewicz ............. 384/276 |

OTHER PUBLICATIONS

Roto Frank of America, The Roto-Pro™ Locking System, The Roto-Pro™ Hinge Series, Product Specifications, pp. 1, 2001.

Roto, The New Roto Pro-Drive™ Operator Series, pp. 1.

* cited by examiner

OPERATOR ASSEMBLY

CROSS-REFERENCES TO RELATED APPLICATIONS

This application claims priority under 35 U.S.C. § 119(e) to, and hereby incorporates by reference, U.S. Provisional Application No. 60/451,462, filed 1 Mar. 2003.

FIELD OF THE INVENTION

This invention relates to operators and, in particular, this invention relates to operators suitable for casement windows and awnings.

BACKGROUND OF THE INVENTION

Operators, such as those used for casement windows, typically have a mounting platform, which rotatably includes a gear and a pull arm. The gear meshes with a worm gear on a shaft, often with a handle affixed to the shaft. The pull arm is coupled to the window. Rotating the worm shaft rotates the gear and the pull arm thereby opening and closing the window. In some instances, a second pull arm is used. The second pull arm often engages the first pull arm by means of another gear or pivot arrangement, the two arms ultimately driven by rotating the single worm shaft. A typical operator of this type has a cover and a base, the cover and base trapping a first gear. At least one operator arm with a second gear affixed thereto and a bearing therebetween are pivotally installed between the cover and the base. The cover has a post at each end passing through a hole in the base and is swaged to retain the two components together when assembled.

A high torque applied to the input shaft of the operator imparts a high rotational torque on the gear. The high rotational torque causes the gear teeth to generate a undesirable axial force, in addition to the expected tangential force. The axial force tends to push the gear against the cover and at least one of the operator arms toward the base, thereby tending to separate the gear and operator arm and causing two problems. The first problem is that separation allows the gear teeth to slide away and out of position, thereby reducing the extent of the engagement between the gear teeth with other components. Overtime this separation causes failure of the gear teeth. The second problem is that the separation causes the bearing to have reduced contact with either the cover or the base. The reduced contact, in turn, generates stresses causing deformation failure of the bearing support surfaces of the base and/or the cover. These problems, either alone or in combination, will cause the window operator to become difficult to operate or to completely fail to operate.

For these reasons, there is a need for a window operator assembly which maintains proper alignment and engagement of internal components, particularly meshing gears, to prevent undue stress from inducing inefficient operation or a total failure.

SUMMARY OF THE INVENTION

This invention substantially meets the aforementioned needs of the industry by providing an improved operator assembly. The instant operator assembly advantageously opens and closes structures such as casement windows and awnings and may include a housing with a cover and base. The cover may include a central positioning post, at least one fastener post, and an angular tubular portion. The base may be attachable to the cover and may include at least one receiving aperture for receiving the at least one fastener post. A worm may be rotatably disposed within the angled tubular portion. The window operator may further include an operator arm subassembly, which may have at least one operator arm, e.g., a first operator arm, pivotally attached to a second operator arm. At least one of the operator arms defines a bearing receiving aperture and at least one of the operator arms has a portion defining a planet gear.

A sun gear may be provided to operably couple the worm and the planet gear. A bearing is used to support and hold the sun gear in place. The bearing may define an aperture and may comprise base portion, a middle portion, and an upper portion, a shoulder being defined between the middle portion and the upper portion and a recess optionally present between the shoulder and the upper portion. The bearing is inserted through the sun gear and at least one arm. The shoulder portion is then optionally flared outwardly to rotatably retain the sun gear pivotally adjacent to the at least one arm. Once the sun gear is in place, the bearing may be received by the cover positioning post and the cover receiving portion pressed into a corresponding recess in the cover. The positioning post may then be swaged to secure the bearing in place.

To complete the assembly, the base is mated to the cover by receiving at least one fastener post through at least one receiving aperture. The base is then pressed over an optionally knurled portion of the base of the bearing and at least one fastener post may be swaged to retain the base to the cover.

By providing the present operator assembly, the components thereof, more specifically the moving components, are maintained in a proper alignment, by reducing stress and unwanted binding and thus providing an efficiently functioning mechanism.

It is therefore an object of this invention, to provide an operator assembly, the operator assembly including a housing, a driving gear accommodated in the housing, a first arm, a first gear driven by the driving gear and pivoting the first arm, and a bearing. The bearing may be accommodated in the first gear and secured in the housing. The bearing may include a base, a generally cylindrical middle axially extending from the base and with a smaller radius than the base, an upper portion axially extending from the middle and with a smaller radius than the middle, and a shoulder defined between the middle and the upper portion.

A further object is to provide an operator assembly, which includes a cover, a base, a worm, a flanged bearing, and an operator arm subassembly. The cover may include an angled tubular portion and a positioning post. The base may be matable to the cover. The worm may be rotatably disposed in the tubular portion of the cover. The flanged bearing may be accommodated by the positioning post and may include a bearing base, a middle portion, an upper portion, and a shoulder defined between the middle portion and upper portion. The operator arm subassembly may include at least one arm pivotally attached between the cover and the base. The at least one arm may include a gear and may accommodate the flanged bearing. The flanged bearing and the operator subassembly may be secured together by flaring the bearing shoulder portion.

It is a yet further object is to provide an operator assembly, which includes a base, a cover mating with the base and including a positioning post, a worm rotatably accommodated by the base and the cover, an operator arm subassembly, and a flanged bearing. The operator arm subassembly may include a pivot arm, a planet gear arm pivotally joined to the pivot arm and including a planet gear, and a sun gear rotatably meshed with the worm and the planet gear. The flanged bearing may be secured between the base and the cover and pivotally accommodated in the pivot arm and sun gear. The flanged bearing may include a bearing base, a middle portion, and upper portion, and a shoulder defined between the middle portion and the upper portion.

A still further object is to provide an operator assembly including base, a cover matable to the base, a worm, a gear arm, and a flanged bearing. The cover is mountable to the base and includes a positioning post. The worm is rotatably accommodated by the base and the cover. The gear arm includes a gear meshed to the worm and defines a gear aperture. The flanged bearing is disposed in the gear aperture and includes an aperture accommodating the positioning post, an upper portion, a middle portion extending axially from the upper portion and having a greater radius than the upper portion, a base extending axially from the middle portion and having a greater radius than the middle portion, and a shoulder defined between the middle portion and the upper portion.

A still yet further object is to provide a method of assembling an operator, the method including pivotally joining a pivot arm and a planet gear arm; inserting a flanged bearing to an aperture defined in the pivot arm and through an aperture defined in a sun gear, the flanged bearing comprising base, a middle portion axially extending from the base, an upper portion axially extending from the middle portion, and a shoulder defined between the middle portion and the upper portion; accommodating the flanged bearing about a positioning post of a base; rotatably disposing a worm in the base and in a cover, and mating the base and the cover.

A still yet further object is to provide a method of assembling an operator, the method including disposing a flanged bearing in an aperture defined in a gear, the flanged bearing comprising a bearing base, a middle portion extending from the bearing base, and upper portion extending from the middle portion, and a shoulder defined between the middle portion and the upper portion, the gear extending from a gear arm; securing the flanged bearing between a cover and base; and mating the base and the cover.

These and other objects, as well as features and advantages of this invention will become apparent from the description which follows, when considered in view of the accompanying drawings.

It is understood that the above-described figures are only illustrative of the present invention and are not contemplated to limit the scope thereof.

DETAILED DESCRIPTION OF THE INVENTION/DRAWINGS

Unless otherwise defined, all technical terms used herein have the same meaning as commonly understood by one of ordinary skill in the art to which this invention belongs. In case of conflict, the present specification, including definitions, will control. Although methods and materials similar or equivalent to those described herein can be used to practice the invention, suitable methods and materials are described below. In addition, the materials, methods, and examples are illustrative only and not intended to be limiting.

Any references to such relative terms as inner and outer, upper and lower, or the like, are intended for convenience of description and are not intended to limit the present invention or its components to any one positional or spatial orientation. All dimensions of the components in the attached figures may vary with a potential design and the intended use of an embodiment of the invention without departing from the scope of the invention. Each of the additional features and methods disclosed herein may be utilized separately or in conjunction with other features and methods to provide improved operator assemblies and methods for making the same.

Figure 1:
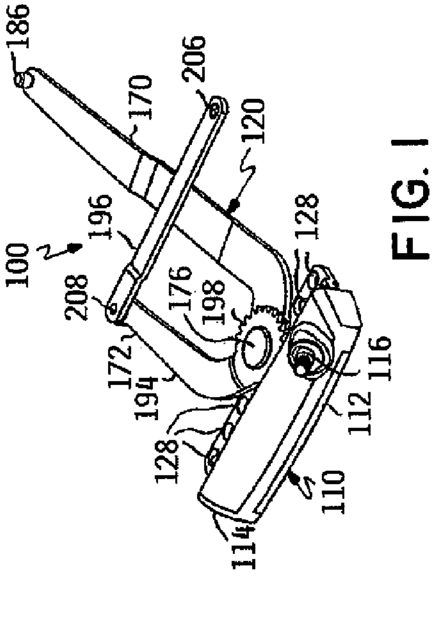
FIG. 1 is an isometric view of a first assembled embodiment of the operator assembly of this invention.
Figure 2:
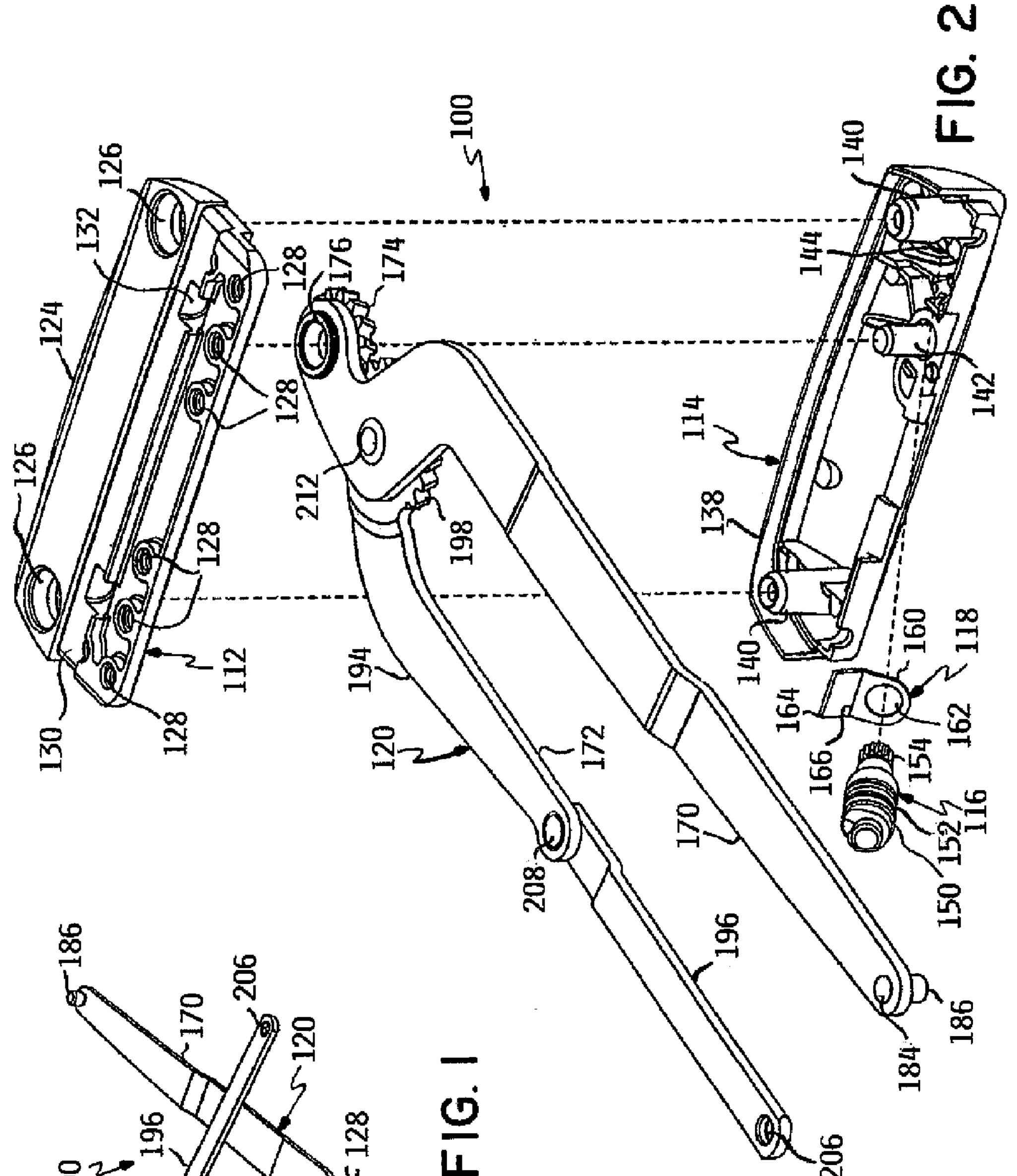
FIG. 2 is an exploded view of the operator assembly of FIG. 1.
Figure 6:
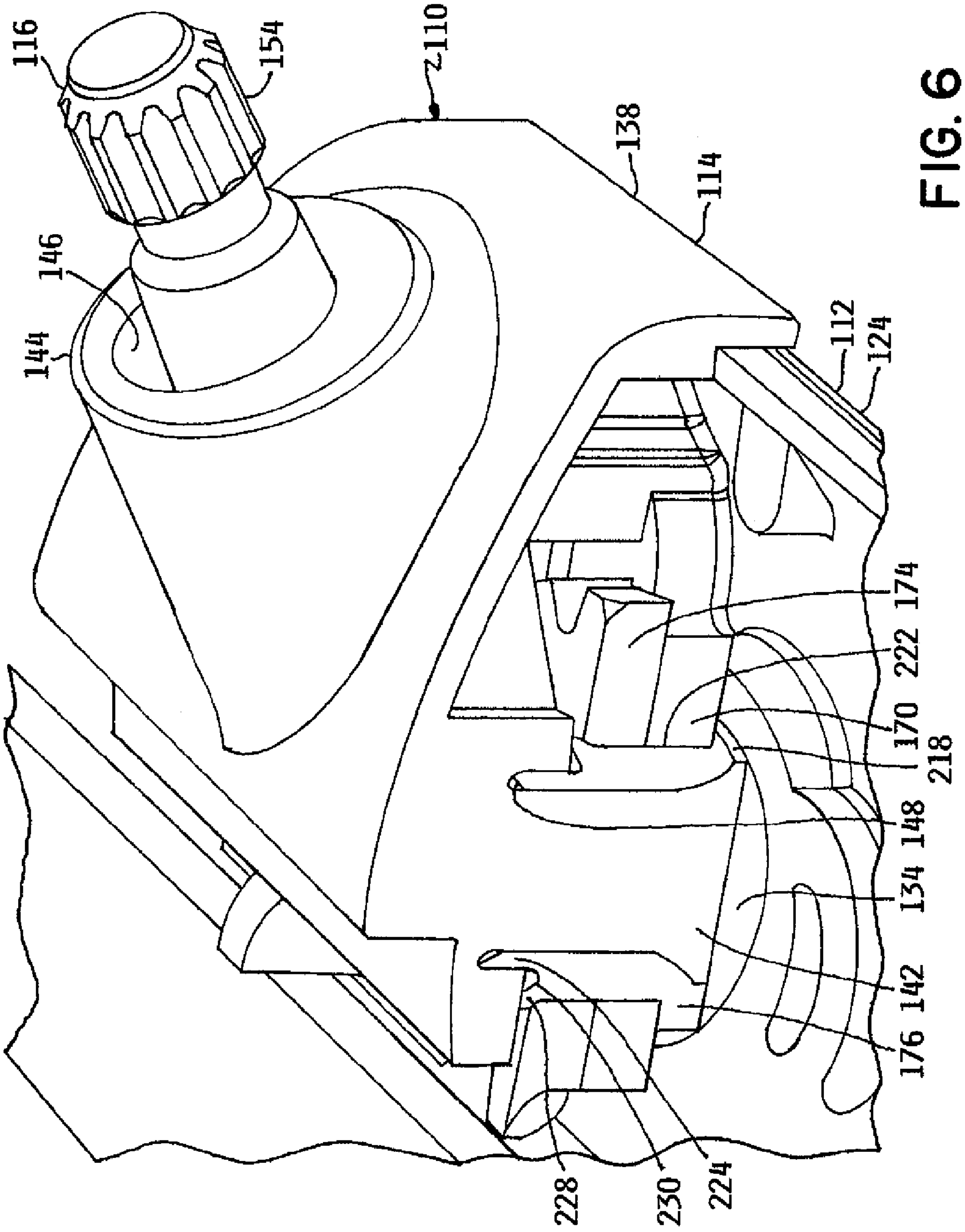
FIG. 6 is a fragmentary cross-sectional view of the assembled operator assembly of FIGS. 1 and 2.
Figure 7:
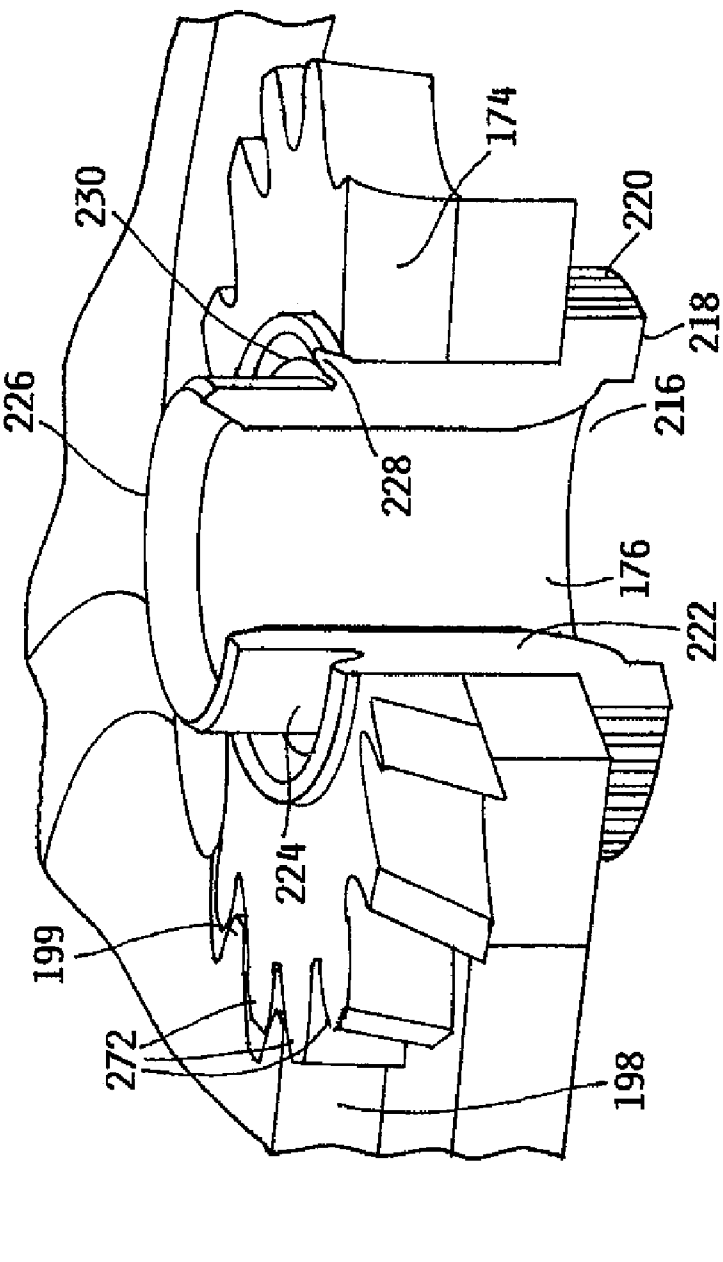
FIG. 7 is a fragmentary cross-sectional view of the operator arm subassembly of this invention with the flanged bearing of FIGS. 3*a*-3*d* positioned therein.
Figure 8A:
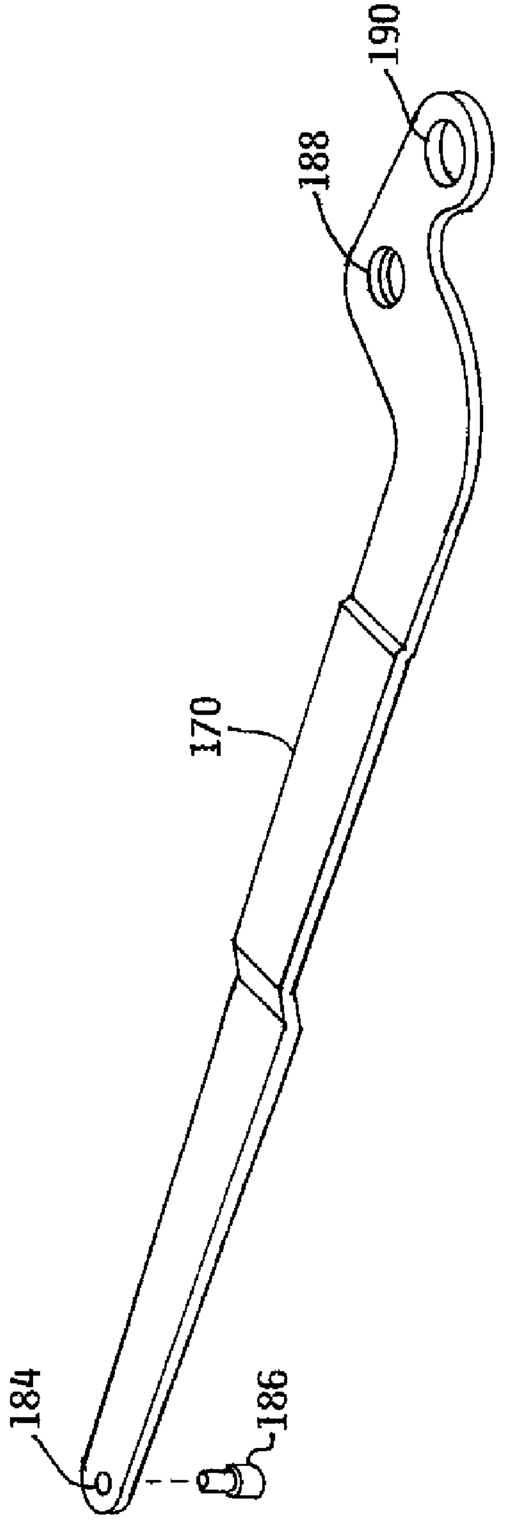
FIG. 8*a* is an exploded view of the long arm shown in FIGS. 1 and 2.
Figure 8B:
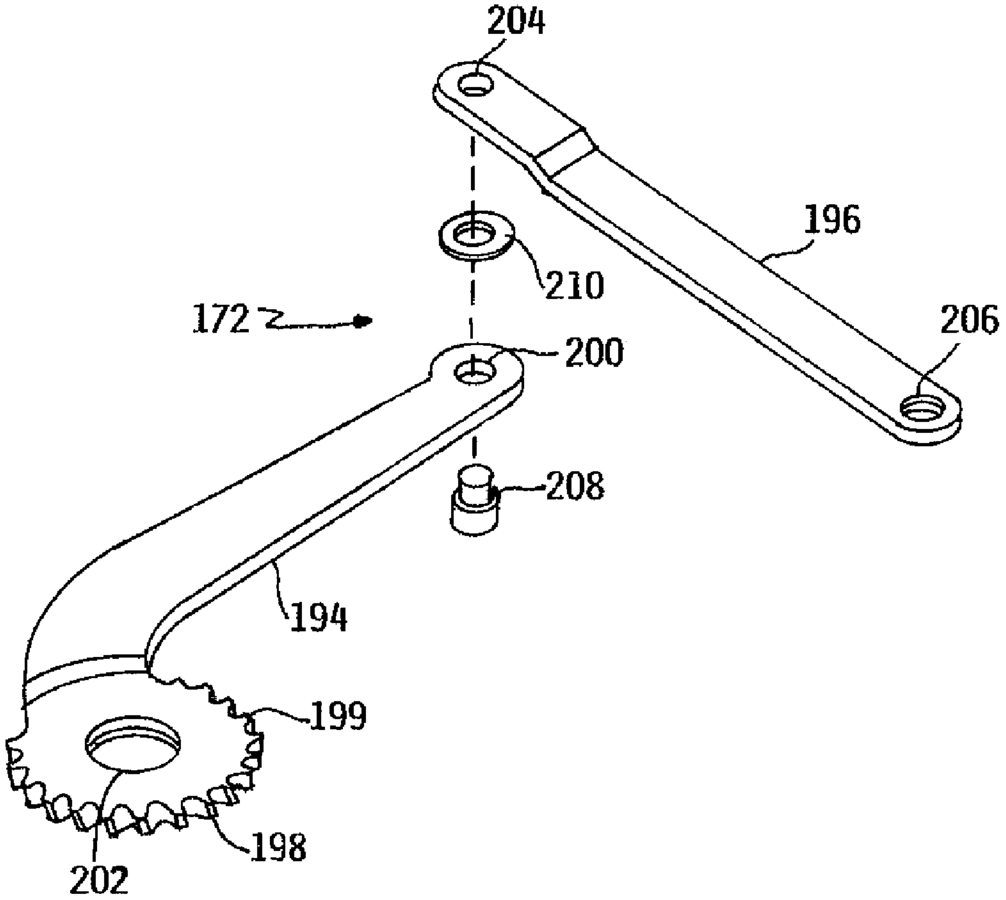
FIG. 8*b* is an exploded view of the planet and gear arm assembly of this invention.
Figure 8C:
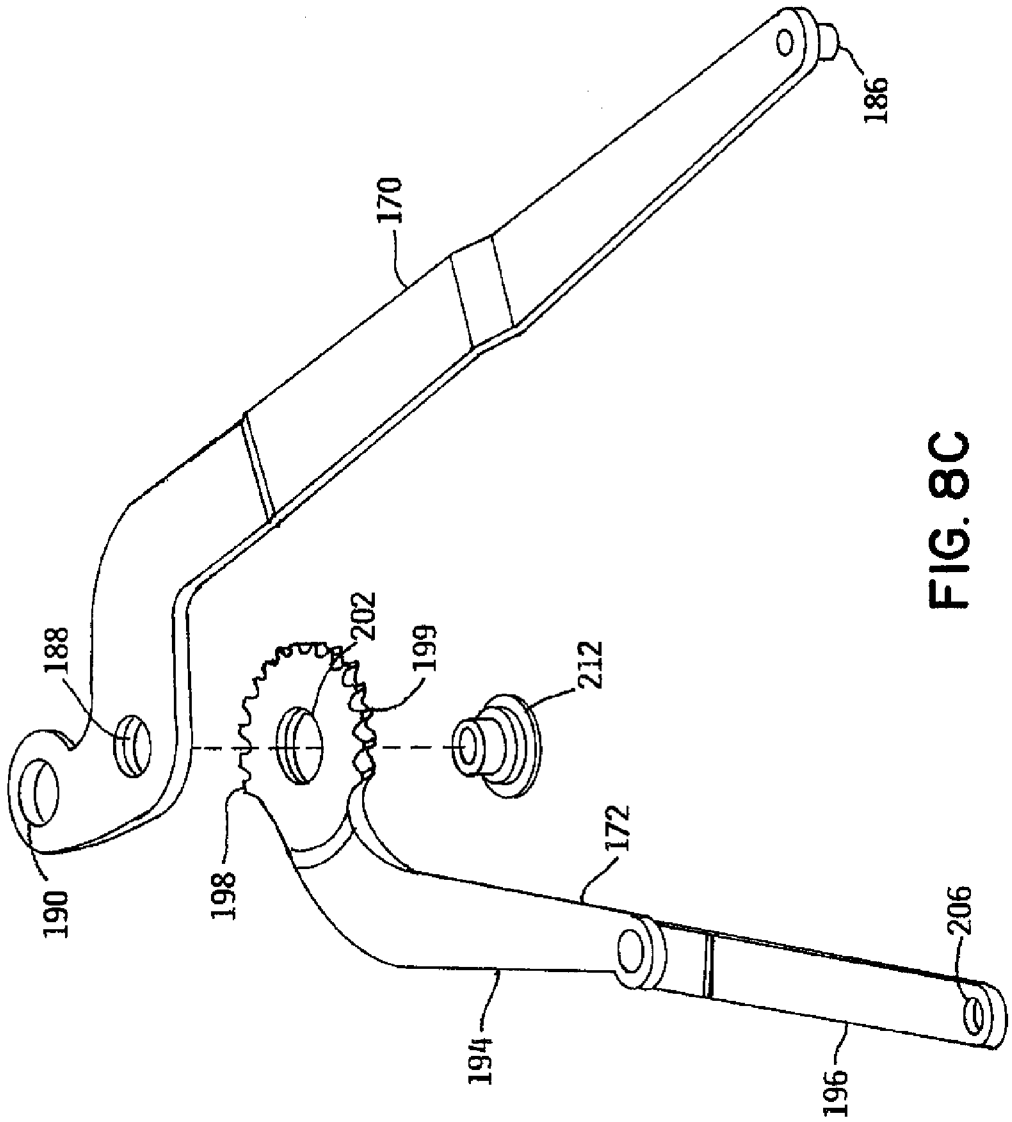
FIG. 8*c* is an exploded view of a portion of the operator arm assembly of this invention.
Figure 8D:
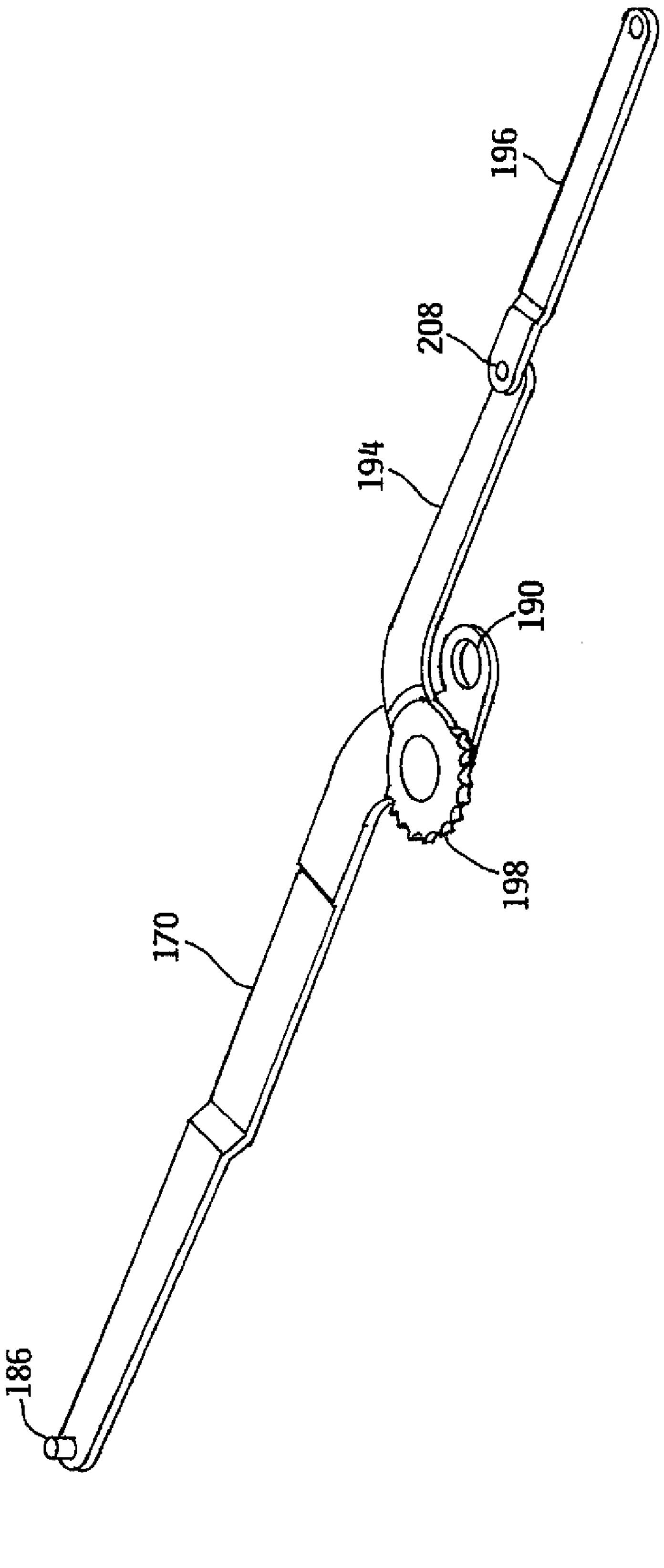
FIG. 8*d* is an isometric view of an assembled portion of the operator arm subassembly of this invention.

FIGS. 1-8*d* depict a first embodiment of the operator assembly of this invention indicated generally at 100. Referring now to FIGS. 1 and 2, the operator assembly 100 includes a housing 110, which, in turn, includes a base 112 and a cover 114. Operationally, the operator assembly 100 of this invention includes a driving gear such as a worm 116, a bushing 118, and an operator arm subassembly 120. In the embodiment depicted, the base 112 has a base body 124 defining a plurality of (e.g., two) fastener post apertures 126, a plurality of (e.g., six) attachment apertures 128, a slot 130, an angled support surface 132, and a recess 134 (shown in FIG. 6). In the embodiment depicted, the slot 130 is substantially rectangular in cross section, extending at least partially across the base. The slot 130 may be present to receive raised portions of the surface on which the instant operator is mounted and also may function to prevent infiltration of contaminants, such as air, water, or debris, from entering the instant operator. The inner manifestation of the support surface 132 (opposite the outer support surface 132 as shown in FIG. 2) positions and supports the worm 116. Referring particularly to FIG. 6, the recess 134 is dimensioned and positioned to receive a flanged bearing of the operator arm subassembly 120, as described below.

Referring again to FIGS. 1, 2, and 6, the cover 114 includes a cover body 138, a plurality of (e.g., two) fastener posts 140, a positioning post 142, and an angled tubular portion 144. The fastener posts 140 and positioning post 142 extend inwardly from the cover body 138. As seen in FIG. 6, the tubular portion 144 defines an aperture 146 and a recess 148 is defined in the cover body 138 to surround the positioning post 142. The fastener posts 140 are dimensioned and positioned to be received in the fastener post apertures 126 of the base 112 and to threadably receive fasteners such as screws to affix the base 112 to the cover 114. The positioning post is dimensioned and positioned to receive the instant flanged bearing of the operator arm subassembly 120 (described below). The angled tubular portion 144 is dimensioned to rotationally accommodate the worm 116 therewithin. The base 112 and cover 114 may be made with a zinc die case manufacture in some embodiments. However, other materials such as steel alloys, aluminum, and synthetic resins may be suitable for other embodiments.

The worm 116 includes a worm body 150 having a threaded portion 152 and a worm shaft 154 extending from the worm body 150. The worm shaft 154 is configured to receive an actuator, such as a handle (not shown). The bushing 118 has a first portion 160 defining an aperture 162 and a generally planar second portion 164 separated from the first portion 160 by a bend 166. The bushing aperture 162 is dimensioned to accommodate the worm shaft 154. The bushing second portion 164 operationally supports the worm 116 and helps prevent moisture and debris from entering the instant operator.

The operator arm subassembly 120 includes a first arm such as a long (pivot) arm 170, a second arm such as a planet gear arm 172, a first driven gear such as a sun gear 174, and a flanged bearing 176 (as mentioned above). Referring particularly to FIGS. 2 and 8*a*-8*d*, the long arm 170 defines a distal aperture 184 receiving a pivot 186, a pivot aperture 188, and a bearing aperture 190. The planet gear arm 172 may be considered to include an arm portion 194 and an optional extension 196. The arm portion 194 includes a second driven gear such as a planet gear 198 with teeth 199 and defines a distal aperture 200, the planet gear 198 defining a planet gear aperture 202. The optional extension has proximal aperture 204 and a distal aperture 206. The distal aperture 206 is dimensioned to accommodate a pivot 208 when the arm portions 194 and 196 are pivotally joined, optionally with a washer 210 therebetween. The long arm 170 may be pivotally attached to the planet gear arm 172 by extending a pivot pin (or other fastener) 212 through the aligned pivot aperture 188 and planet gear aperture 202.

Figure 3A:
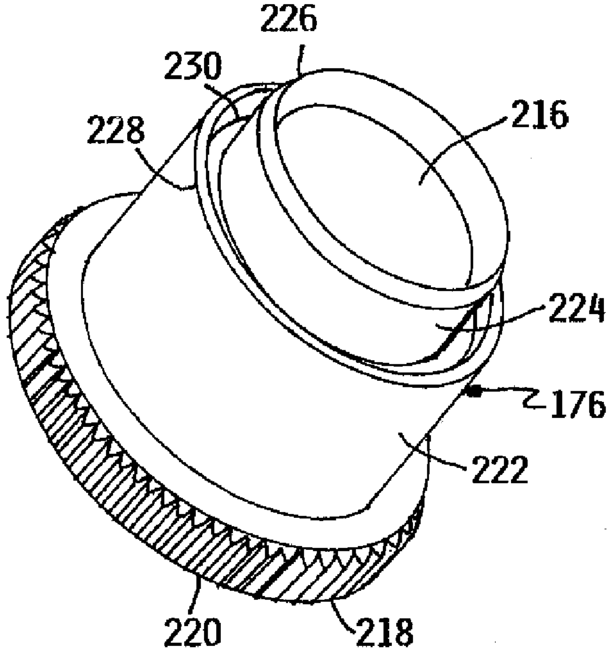
FIG. 3*a* is an isometric view of a first embodiment of the flanged bearing of this invention.
Figure 3B:
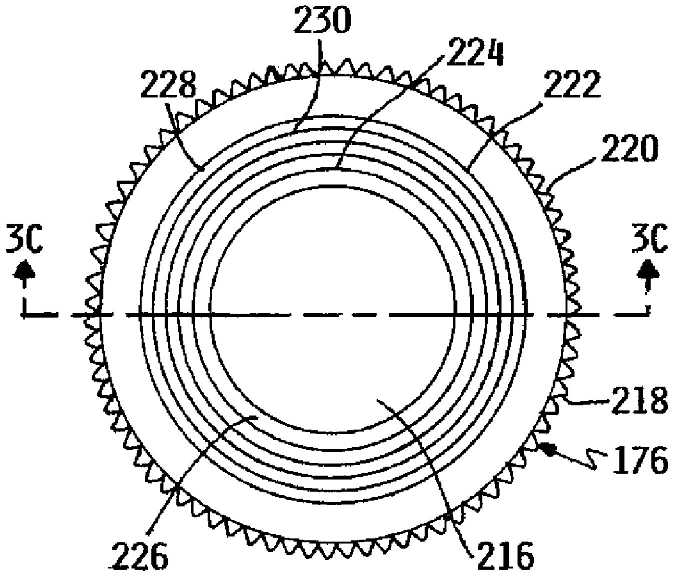
FIG. 3*b* is a top view of the flanged bearing of FIG. 3*a;*
Figure 3C:
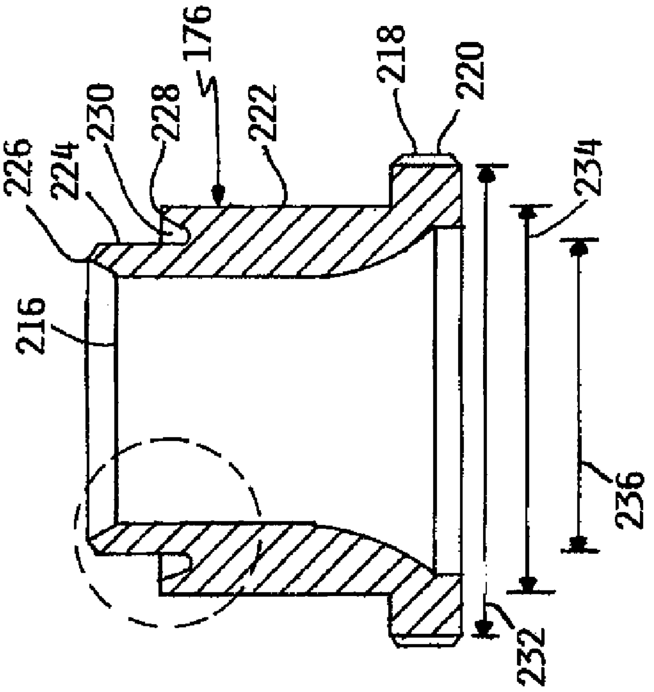
FIG. 3*c* is a cross sectional view of the flanged bearing of FIG. 3*a*, taken along line 3*c*-3*c* of FIG. 3*b;*
Figure 3D:
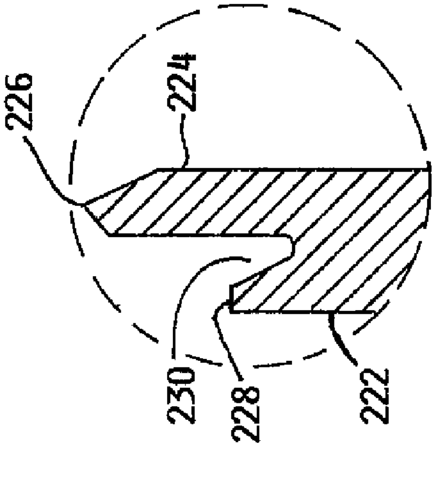
FIG. 3*d* is a fragmentary sectional view of the flanged bearing of FIG. 3*a* taken from the encircled portion of FIG. 3*c;*
Figure 3E:
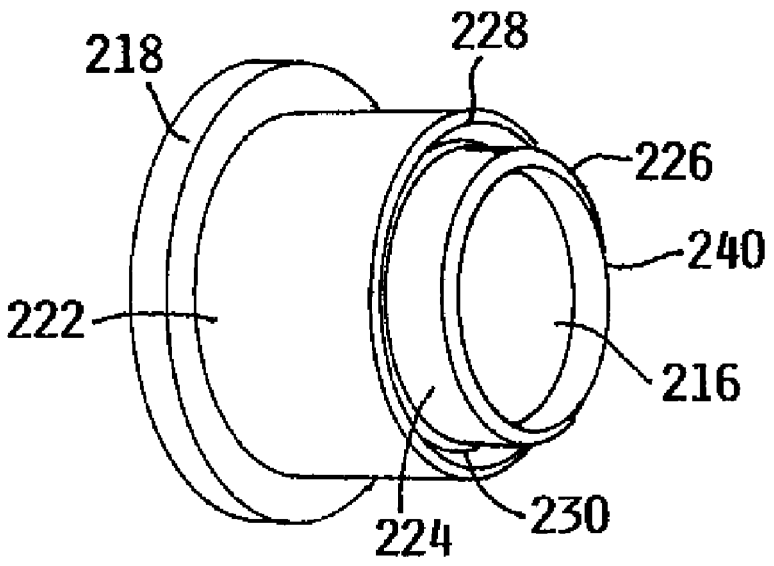
FIG. 3*e* is an isometric view of another embodiment of the flanged bearing of FIGS. 3*a*-3*d;*
Figure 4:
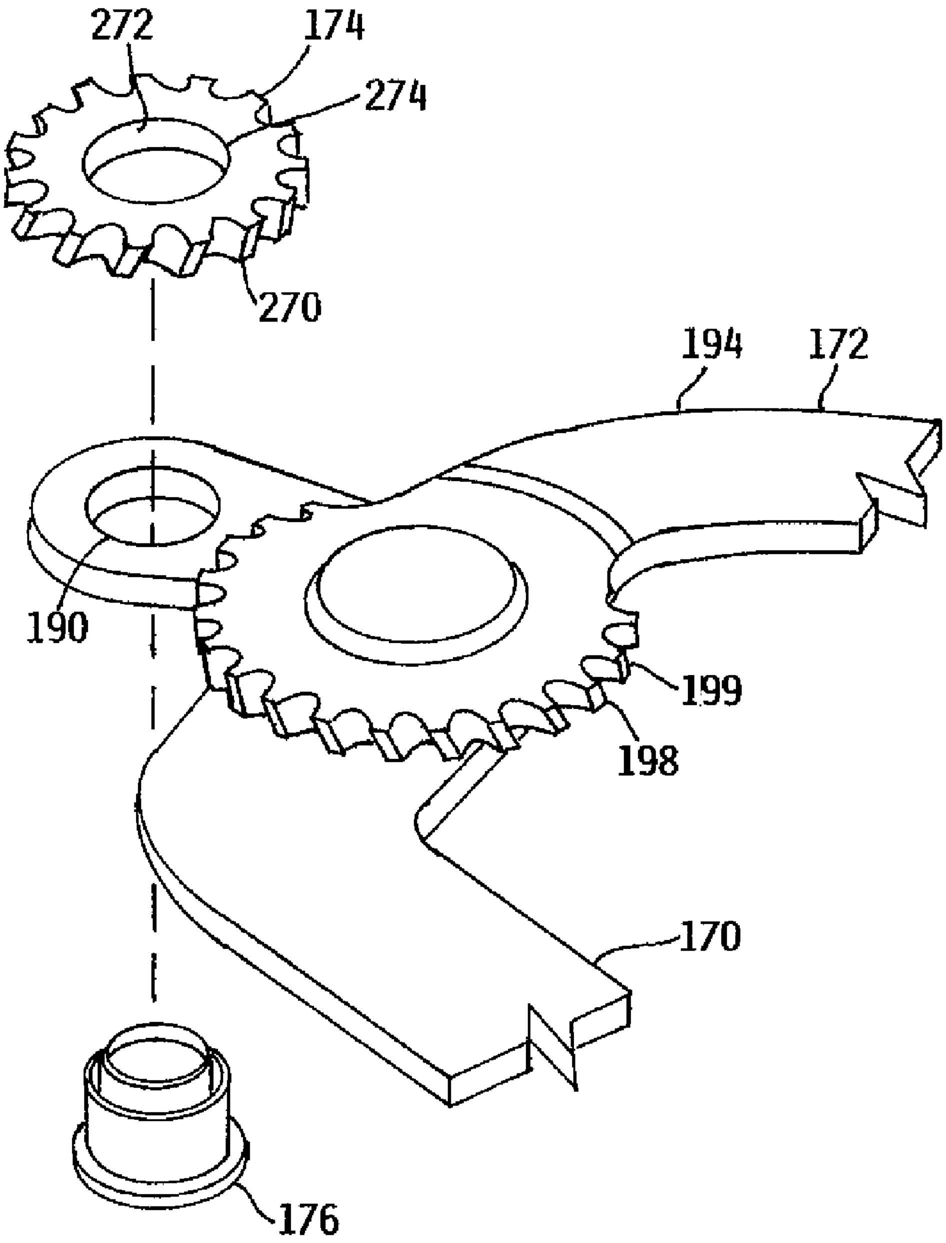
FIG. 4 is an exploded view of the flanged bearing subassembly of FIGS. 1 and 2.
Figure 5:
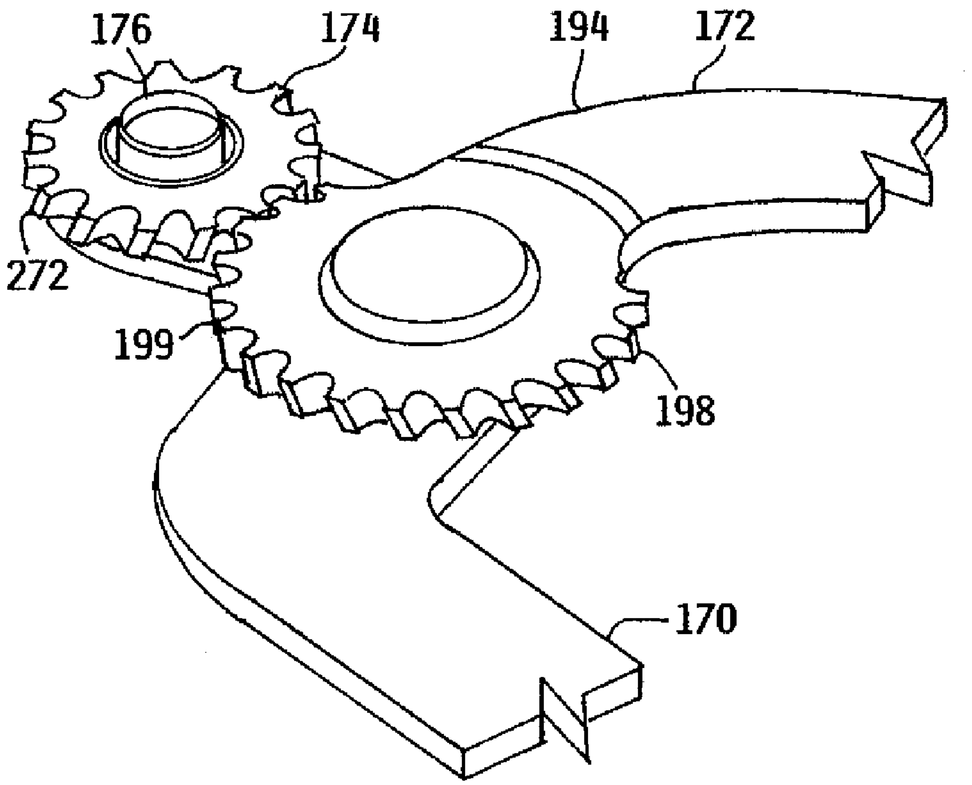
FIG. 5 is an isometric view of the assembled flanged bearing subassembly depicted in FIG. 4.

As best seen in FIGS. 3*a*-3*d*, the flanged bearing 176 defines a generally coaxial aperture 216 by having a base 218 with an optional friction-increasing surface such as a knurled surface 220, a middle portion 222, and an upper portion 224. The upper portion 224 displays an upper surface 226. In the embodiment depicted, a shoulder 228 is present proximate the junction of the middle portion 222 and the upper portion 224. A recess 230 is further defined between the shoulder 228 and the upper portion 224. The knurled surface 220 may be useful in preventing the flanged bearing from rotating during use in some embodiments. As can be seen from FIGS. 3*a*-3*c*, a radius 232 of the base 218 is greater than a radius 234 of the middle portion 222, which, in turn, is greater than a radius 236 of the upper portion 224. Referring now to FIG. 3*e*, another embodiment of the instant flanged bearing is indicated at 240. The bearing 240 may be substantially identical to the bearing 176, except for the absence of the knurled surface on the base 218. Yet another embodiment of the flanged bearing of this invention is shown in FIGS. 11*a*-11*d* at 250 and includes a base 252, a middle portion 254, and an upper portion 256 with an upper surface 258. An optional knurled surface 260 is present on an upper part of the base 252. A shoulder 262 is defined between the middle and upper portions 254 and 256. However, unlike the shoulder 228 of the flanged bearing 176, a recess is not defined between the shoulder 262 and the upper portion 256. The bearings 240 and 250 also advantageously have the stepped conformation as described with respect to the bearing 176. Some of the advantages of the stepped conformation of the instant flanged bearing are discussed below.

The sun gear 174 includes teeth 270 and defines an aperture 272. The sun gear 174 and the planet gear 198 are dimensioned to operably mesh together and to rotate the arms 170 and 172 to a desired extent during use of the instant operator. The sun gear aperture 272 and the long arm bearing aperture 190 are further sized to rotationally accommodate the instant flanged bearing.

Referring to FIGS. 8*a*-8*d*, the operator arms 170 and 172 of the operator arm subassembly 120 are pivotally attached by inserting the pivot pin 212 in the pivot aperture 188 and planet gear aperture 202, respectively. If employed, the planet gear arm extension 196 is pivotally attached to the planet gear arm portion 194 by inserting the arm extension pivot pin 208 through the apertures 200 and 204 of the planet gear arm portion and extension, respectively. Referring now to FIGS. 4-7, the assembly of the operator arm subassembly 120 is completed by inserting the present flanged bearing 176, 240, or 250. While any of the foregoing embodiments of the present flanged bearing may be suitable, installation of the flanged bearing 176 will be described. The flanged bearing 176 is installed through the long arm aperture 190 and the sun gear aperture 174 so that the long arm 170 and sun gear 174 are positioned to rotationally contact the bearing middle portion 222. The bearing shoulder portion 228 (or edge of the shoulder portion) is then flared outwardly to retain the sun gear 174 and long arm 170 between the flared shoulder portion 228 and the bearing base 218 (FIG. 7), so that the long arm 170 and sun gear 174 are securely held therebetween, yet capable of rotating independently of one another. By flaring the bearing shoulder 228, the sun gear teeth 270 are prevented from laterally displacing from a meshed position with the planet gear teeth 199, especially when encountering high loads. Positioning the long arm 170 and sun gear 174 between the bearing flared shoulder 228 and bearing base 218 also reduces loads tending to separate the cover 114 from the base 112 as well. The optional sun gear optional countersink 274 accommodates the flared shoulder portion, thereby slightly reducing the overall height of the assembled operator assembly 100. Alternatively, the flanged bearing shoulder 228 is not flared. Rather, the long arm 170 and sun gear 174, when positioned as described above, are retained in place by the bearing base 218 and middle portion 222 of the flanged bearing 176. Thus, whether flared or not, the presence of the instant flanged bearing reduces forces otherwise tending to separate the long arm 170 and the sun gear 174.

After having assembled the operator arm subassembly 120, the bushing 118 and worm 116 are disposed within the angular tubular portion 144. When the worm 116 is disposed in the angular tubular portion 144, the worm shaft 154 extends from the shaft aperture 144. It should, however, be noted that positioning the bushing 118 and worm 116 can occur before the operator arm subassembly 120 is that assembled, provided that the bushing 118 and worm 116 are in place before the present subassembly 120 is installed on the cover 114. The operator arm subassembly 120 is slid over the positioning post 142 on the cover 114. The upper portion 224 of the flanged bearing 176 is then pressed into the recess 148 defined in the cover 114 to provide positive location and to support at least a portion of the side forces generated on the flanged bearing 176 during operation. This arrangement also may eliminate the need for the post 142 to solely support side forces generated during use, thereby reducing the total stress on the post 142. Reducing the total stress on the post 142 promotes operator longevity. The post 142 may then be optionally swaged or otherwise shaped to retain the operator arm subassembly 120 and to further sustain axial loads exerted on the flanged bearing 176 during operation. If present, the optional recess 230, present in one embodiment of the flanged bearing, is provided for the swaged post 142 to flow into during swaging. In some embodiments presence of portions of the swaged post in the optional recess 230 slightly reduces the overall height of the assembled operator assembly 100. Alternatively, if the flanged bearing shoulder 220 is not flared, the flared bearing 176 can be disposed about the positioning post 142 and pressed into the cover recess 148 before the arms 170 and 172 and sun gear 174 are mounted on the bearing 176. Stated otherwise, the bearing 176 is first positioned in place, then the operator arms 170 and 172 and sun gear 174 are positioned about the bearing 176.

When the operator arm subassembly 120 is in place, the base 112 is fitted over the cover 114 by inserting the cover fastener posts 140 through the fastener post apertures 126 of the base 112. The base 112 is then pressed over the optionally knurled base portion 220 of the flanged bearing 176, thereby preventing the bearing 176 from rotating during use. Contacting the base 112 to the knurled base portion 220 also allows the base 112 to support the remainder of the side forces generated against the flanged bearing 176 during operation. Finally, to retain the base 112 and the cover 114 in place, the fastener posts 140 may be swaged or staked. With the base 112 and the cover 114 attached, the worm 116, sun gear 174, and planet gear 198 are then rotated so that rotating the worm 176 via the worm shaft 154 and attached actuator, e.g., handle, will, in turn, pivot the operator arms 170 and 172 and thereby open or close and attached window as desired. Moreover, attaching the base 112 to the cover 114 positions the flanged bearing 176 and sun gear 174 to prevent, or otherwise minimize, axial (e.g., upward and downward) movement of the gear along the gear axis. By preventing axial movement of the sun gear 174, the sun gear teeth 270 remain fully engaged with the worm thread 152 and planet gear teeth 199, thereby further ensuring proper and efficient function of the window operator assembly 100.

Figures 9A, 9B:
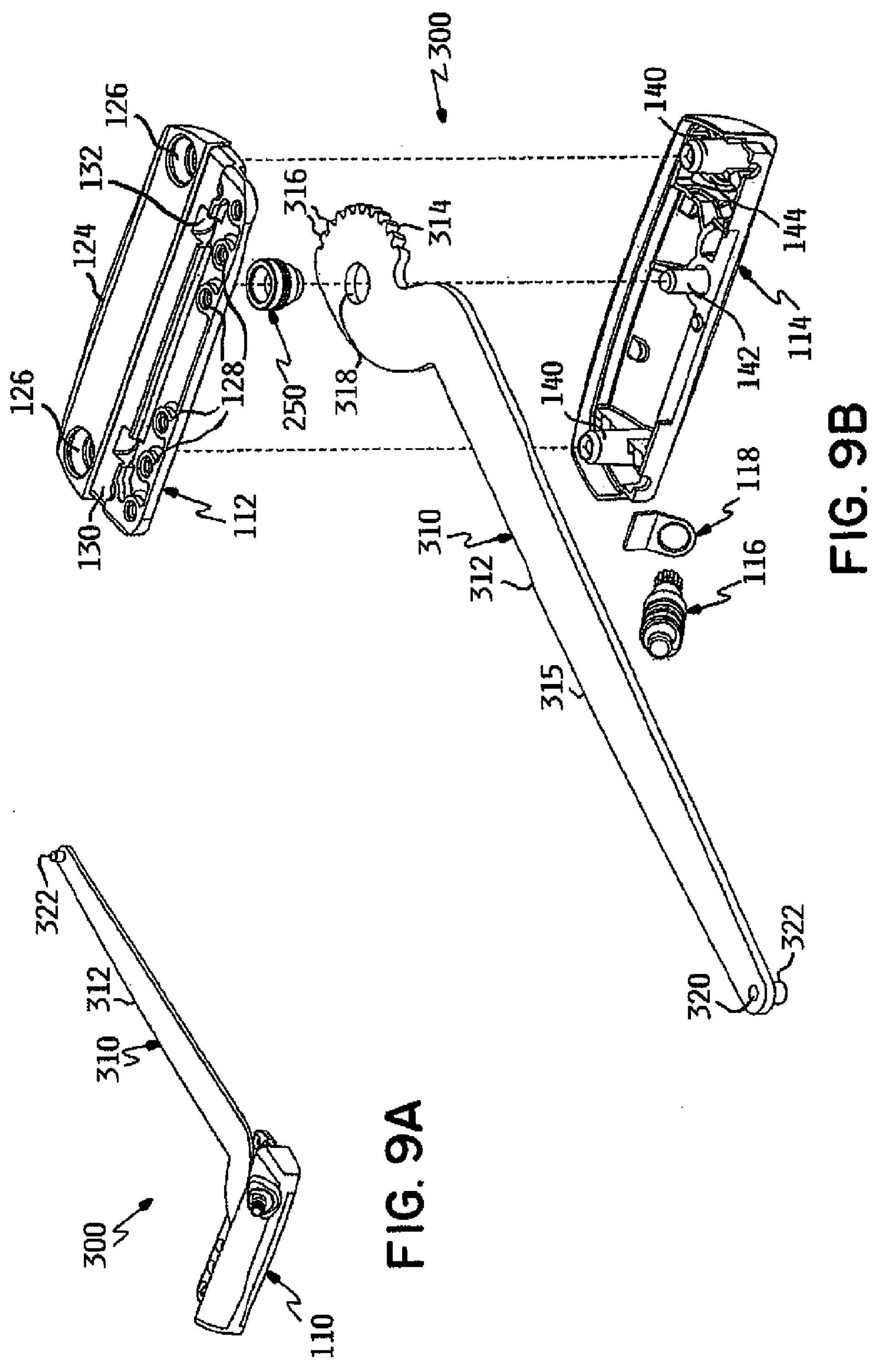
FIG. 9*a* is an isometric view of a second assembled embodiment of the operator assembly of this invention.
FIG. 9*b* is an exploded view of the operator of FIG. 9*a;*

Referring to FIGS. 9*a* and 9*b*, another embodiment of the present operator assembly is depicted generally at 300. The operator assembly 300 differs from the previous embodiment in the presence of a single operator arm. The other components may be similar, or substantially identical, to those described and depicted above with respect to the operator assembly 100 and are numbered similarly. The flanged bearing 250 is depicted as being used with this embodiment. However, the other embodiments of the instant flanged bearing, e.g., those designated 176, 240 or an equivalent, could be used as well. In addition to the other components, the operator assembly 300 includes a single arm operator subassembly 310, which, in turn, has a singular gear arm 312. The gear arm 312 has a gear 314 and an arm portion 315. The gear 314 is characterized by teeth 316 and a gear aperture 318. The arm portion 315 defines a distal aperture 320 and a pivot 322 is accommodated in the distal aperture 320.

Figures 10A, 10B:
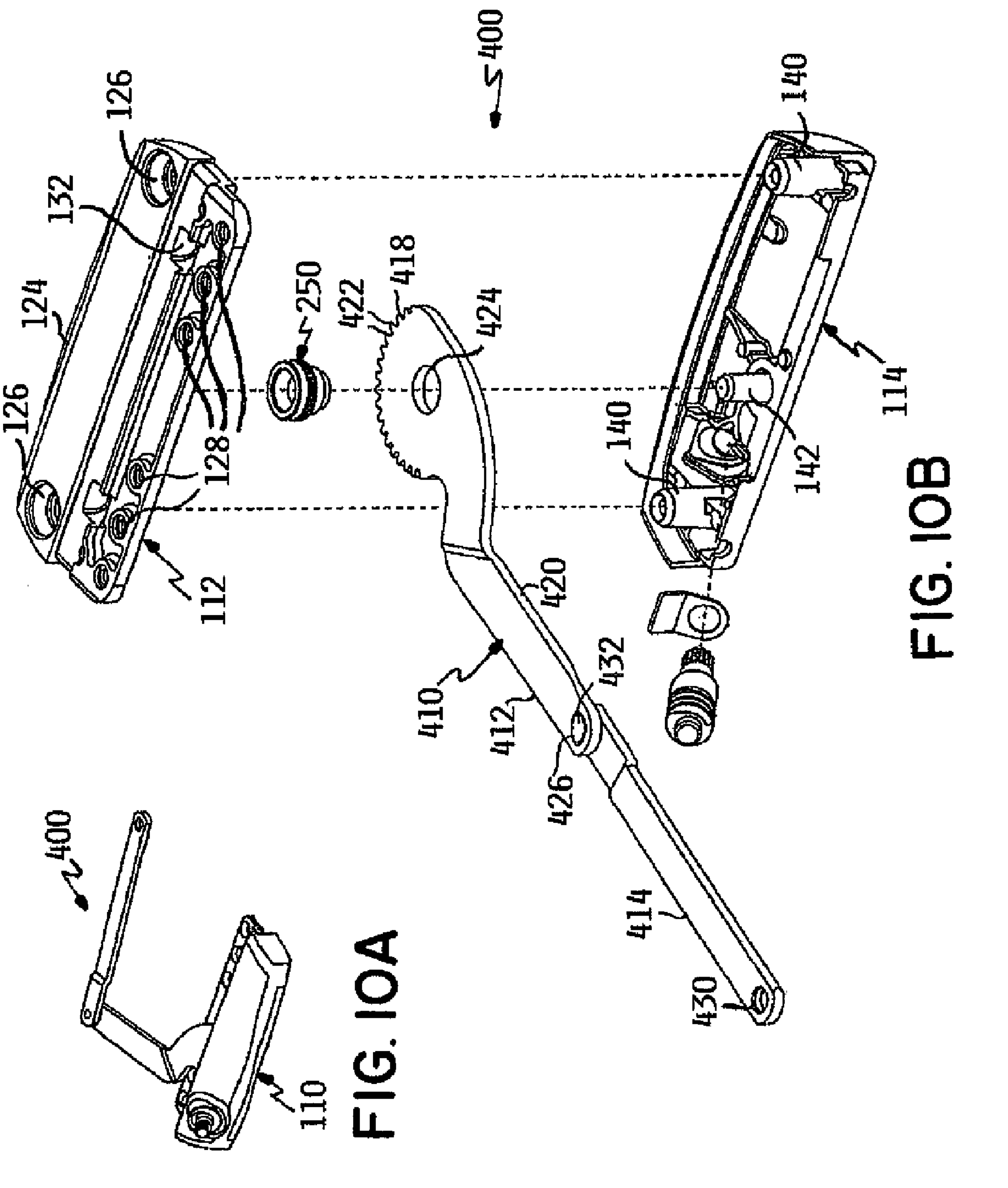
FIG. 10*a* is an isometric view of a third assembled embodiment of the operator of this invention.
FIG. 10*b* is an exploded view of the operator of FIG. 10*a;*
Figure 11A:
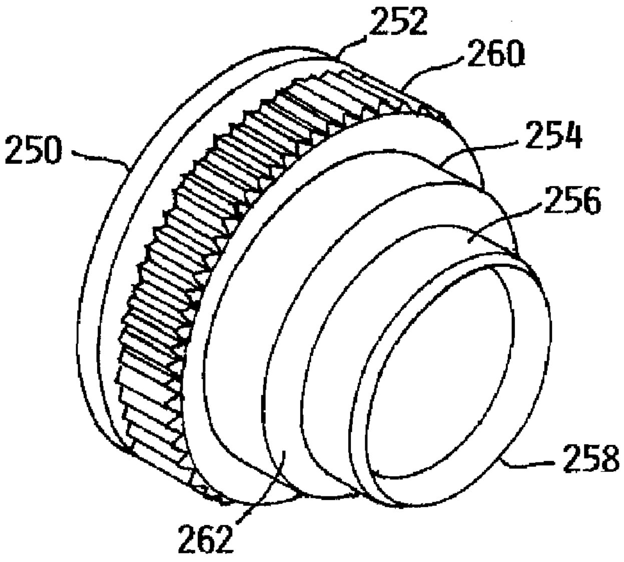
FIG. 11*a* is an isometric view of a third embodiment of the flanged bearing of this invention.
Figure 11B:
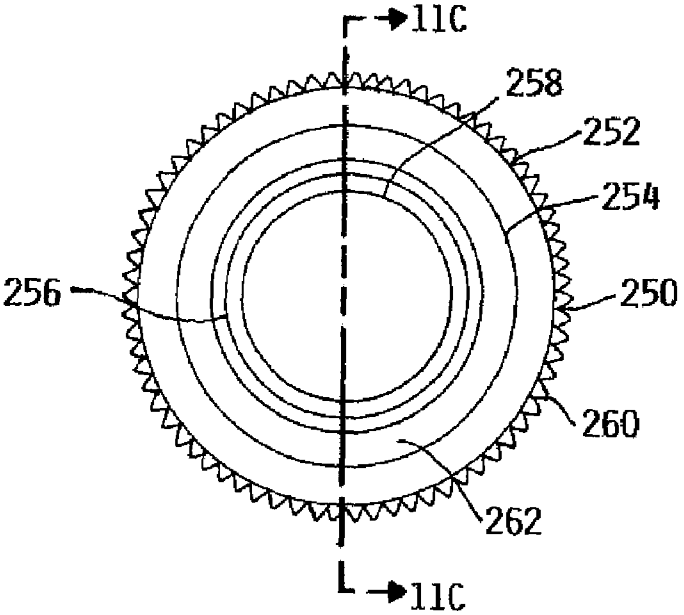
FIG. 11*b* is a top view of the flanged bearing of FIG. 11*a;*
Figure 11D:
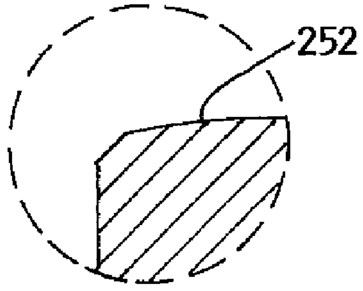
FIG. 11*d* is a fragmentary sectional view of the flanged bearing of FIG. 11*a* taken from the encircled portion of FIG. 11*c*.
Figure 11C:
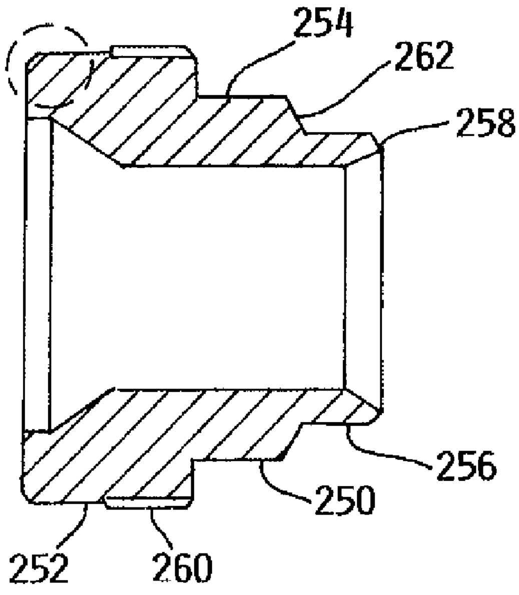
FIG. 11*c* is a cross sectional view of the flanged bearing of FIG. 11*a*, taken along line 11*c*-11*c* of FIG. 11*b*.

FIGS. 10*a* and 10*b* depict a third embodiment of the present operator assembly generally at 400. The operator assembly 400 differs from the previous embodiments 100 and 300 in the presence of a singular articulated gear arm. The other components present may be either similar, or substantially identical, to those described and depicted above with respect to the operator assembly 100 and are numbered similarly. The flanged bearing 250 is depicted as being used with this embodiment. However, it should be understood that the other embodiments, i.e., 176, 240 or an equivalent, can be used as well. In addition to the other components, the operator assembly 400 includes an operator arm subassembly 410, which has a gear arm 412 and an extension 414. The gear arm 412, in turn, has a gear 418 and an arm portion 420. The gear 418 displays a plurality of teeth 422 and defines a gear aperture 424 and a distal aperture 426. The arm portion 420 defines respective proximal and distal apertures 428 and 430 (aperture 428 disposed beneath aperture 426 in FIGS. 10*a* and 10*b*). A pivot 432 may be disposed in the apertures 426 and 428 to pivotally join the gear arm 412 and the extension 414. The operator assemblies 300 and 400, except as described above, are assembled in a substantially similar manner as the operator 100.

With respect to operator assemblies 300 and 400, the instant flanged bearing is placed in the aperture 318 or 424 within the gears 314 or 418, respectively, to support the single gear arm 312 or 412. If the flanged bearing 250 (the embodiment not defining a recess) is used, the upper shoulder portion 262 is optionally flared outwardly to locate the gears 314 or 418 in position while enabling the gear arm 312 or 412 to pivot when actuated. However, the shoulder portion 262 may not be flared, especially if only one arm is supported by the instant flanged bearing. Moreover, because the gear arm 312 or 412 is attached to the present cover 114, separation loads normally transferred to the base 112 are reduced. Whether or not the shoulder 262 is flared, the bearing. 250 will better withstand forces generated during use and subsequently prevent separation of the base 112 and cover 114.

Because numerous modifications of this invention may be made without departing from the spirit thereof, the scope of the invention is not to be limited to the embodiments illustrated and described. Rather, the scope of the invention is to be determined by the appended claims and their equivalents.

What is claimed is:

1. An operator assembly, comprising:

a housing;

a driving gear accommodated in the housing;

a first arm;

a first gear driven by the driving gear and pivoting the first arm; and a bearing accommodated in the first gear and secured in the housing, the bearing comprising a base, a generally cylindrical middle axially extending from the base and with a smaller radius than the base, an upper portion axially extending from the middle and with a smaller radius than the middle, and a shoulder defined between the middle and the upper portion.

2. The operator assembly of claim 1, in which the housing includes a base and a cover, the bearing secured between the base and the cover.

3. The operator assembly of claim 2, in which the first gear is integral to the first arm.

4. The operator assembly of claim 3, in which the first arm is articulated.

5. The operator assembly of claim 2, further comprising a second arm and a second gear, the second gear meshed with the first gear and pivoting the second arm.

6. The operator assembly of claim 1, in which the bearing further comprises a friction-increasing surface.

7. The operator assembly of claim 6, in which the friction-increasing surface comprises a knurling disposed proximate the bearing base.

8. The operator assembly of claim 1, in which the bearing further comprises a recess defined between the middle and the upper portion.

9. The operator assembly of claim 1, in which the driving gear includes a worm.

10. The operator assembly of claim 1, in which the bearing shoulder is swaged.

11. The operator assembly of claim 1, in which the bearing is accommodated on a positioning post.

12. The operator assembly of claim 11, in which the positioning post is swaged.

13. An operator assembly, comprising:
- a cover comprising an angled tubular portion and a positioning post;
- a base mated to the cover;
- a worm rotatably disposed in the tubular portion;
- a flanged bearing accommodated by the positioning post and comprising a base, a generally cylindrical middle portion axially extending from the base and with a smaller radius than the base, an upper portion axially extending from the middle and with a smaller radius than the middle, and a shoulder between the middle portion and upper portion, and
- an operator arm subassembly comprising at least one arm pivotally attached between the cover and the base, said at least one arm comprising a gear and accommodating the flanged bearing.

14. The operator assembly of claim 13, in which the base comprises a knurled surface.

15. The operator assembly of claim 13, in which the shoulder is swaged.

16. The operator assembly of claim 13, in which the flanged bearing defines a recess between the shoulder and the upper portion.

17. The operator assembly of claim 13, in which the positioning post is swaged.

18. An operator assembly, comprising:
- a base;
- a cover mating with the base and comprising a positioning post;
- a worm rotatably accommodated by the base and the cover;
- an operator arm subassembly comprising a pivot arm, a planet gear arm pivotably joined to the pivot arm and including a planet gear portion, and a sun gear rotatably meshed with the worm and the planet gear portion; and
- a flanged bearing secured between the base and the cover, pivotally accommodated in the pivot arm and sun gear, and comprising a bearing base, a middle portion, an upper portion, and a shoulder defined between the middle portion and the upper portion.

19. The operator assembly of claim 18, in which the flanged bearing further comprises a knurled surface disposed proximate the bearing base.

20. The operator assembly of claim 18, in which the bearing shoulder is swaged.

21. The operator assembly of claim 18, in which the flanged bearing defines a recess between the shoulder and the upper portion.

22. The operator assembly of claim 18, in which the flanged bearing is accommodated by the positioning post.

23. The operator assembly of claim 22, in which the positioning post is swaged.

24. An operator assembly, comprising:
- a base;
- a cover matable to the base and comprising a positioning post;
- a worm rotatably accommodated by the base and the cover;
- a gear arm comprising a gear meshed to the worm gear and defining a gear aperture; and
- a flanged bearing disposed in the gear aperture and comprising a bearing aperture accommodating the positioning post, an upper portion, a middle portion extending axially from the upper portion and having a greater radius than the upper portion, a base extending axially from the middle portion and having a greater radius than the middle portion, and a shoulder defined between the middle portion and the upper portion.

25. The operator assembly of claim 24, in which the flanged bearing further comprises a knurled surface disposed proximate the bearing base.

26. The operator assembly of claim 24, in which the bearing shoulder is swaged.

27. The operator assembly of claim 24, in which the flanged bearing defines a recess between the shoulder and the upper portion.

28. The operator assembly of claim 24, in which the flanged bearing is accommodated by the positioning post.

29. The operator assembly of claim 28, in which the positioning post is swaged.

30. A method of assembling an operator, comprising:
- pivotally joining a pivot arm and a planet gear arm;
- inserting a flanged bearing through an aperture defined in the pivot arm and through an aperture defined in a sun gear, the flanged bearing comprising a base, a middle portion axially extending from the base and with a diameter smaller than the base, an upper portion axially extending from the middle portion and with a diameter smaller than the middle portion, and a shoulder defined between the middle portion and the upper portion;
- accommodating the flanged bearing about a positioning post of a base;
- swaging the shoulder;
- rotatably disposing a worm in the base and in a cover; and
- mating the base and the cover.

31. The method of claim 30, in which the flanged bearing further comprises a shoulder, in which the cover defines a contour accommodating the shoulder and in which the flanged bearing is secured between the cover accommodating contour and the base.

32. The method of claim 30, in which the base defines a recess and in which the bearing base is accommodated in the base recess.

33. The method of claim 30, in which the flanged bearing is secured between the base and the cover.

34. The method of claim 30, further comprising the step of swaging the positioning post.

35. A method of assembling an operator, comprising:
- disposing a flanged bearing in an aperture defined in a gear, the flanged bearing comprising a bearing base, a middle portion extending from the bearing base and with a diameter smaller than the base, an upper portion extending from the middle portion and with a diameter smaller than the middle portion, and a shoulder defined between the middle portion and the upper portion, the gear extending from a gear arm;

securing the flanged bearing between a cover and a base; and mating the base and the cover.

36. The method of claim 35, in which the cover includes a positioning post and in which the secured flanged hearing is accommodated by the positioning post.

37. The method of claim 36, further comprising the step of swaging the positioning post.

38. The method of claim 35, in which the gear arm is pivotally attached to an extension.

* * * * *

UNITED STATES PATENT AND TRADEMARK OFFICE

CERTIFICATE OF CORRECTION

PATENT NO. : 7,464,619 B2
APPLICATION NO. : 10/790667
DATED : December 16, 2008
INVENTOR(S) : Vetter It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 592 days.

Delete the phrase "by 592 days" and insert -- by 1201 days --

Signed and Sealed this

Twentieth Day of April, 2010

David J. Kappos
*Director of the United States Patent and Trademark Office*